United States Patent [19]
Bomar

[11] Patent Number: 4,926,657
[45] Date of Patent: May 22, 1990

[54] HEAT PIPE ASSISTED EVAPORATIVE COOLER

[76] Inventor: Elmer B. Bomar, 3601 E. Pierson, Phoenix, Ariz. 05018

[21] Appl. No.: 375,203

[22] Filed: Jun. 30, 1989

[51] Int. Cl.[5] ............................................. F28D 5/00
[52] U.S. Cl. .................................................... 62/311
[58] Field of Search .................. 62/304, 305, 309, 311

[56] References Cited

U.S. PATENT DOCUMENTS 4,827,733  5/1989  Dinh ........................................ 62/305

Primary Examiner—Henry A. Bennet
Attorney, Agent, or Firm—James F. Duffy

[57] ABSTRACT

A cooler which uses evaporative cooling pads and heat pipes in complementary arrangement. The combined operation of these two elements permits the cooler to operate efficiently under temperature and humidity conditions at which conventional evaporative coolers prove impractical to use. The heat pipes serve the purpose normally fulfilled by evaporators and compressors in a refrigeration system. However, since there is no need for a compressor in the invention, the costs of purchasing and operating and maintaining a compressor operated refrigeration system are obviated. The invention provides the user with the performance of a refrigerant coolant system at the operating costs of an evaporative cooler system.

11 Claims, 2 Drawing Sheets

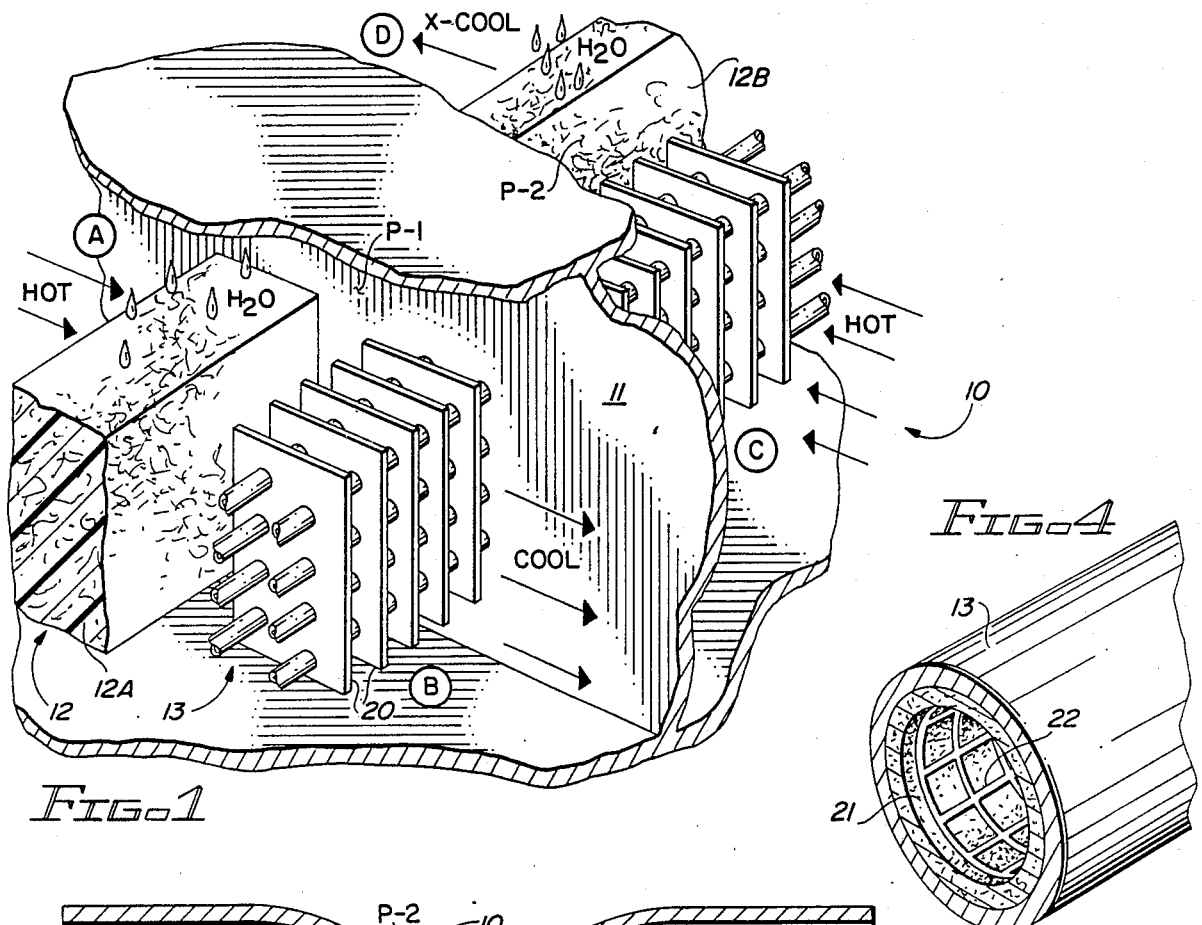
FIG-1
FIG-4
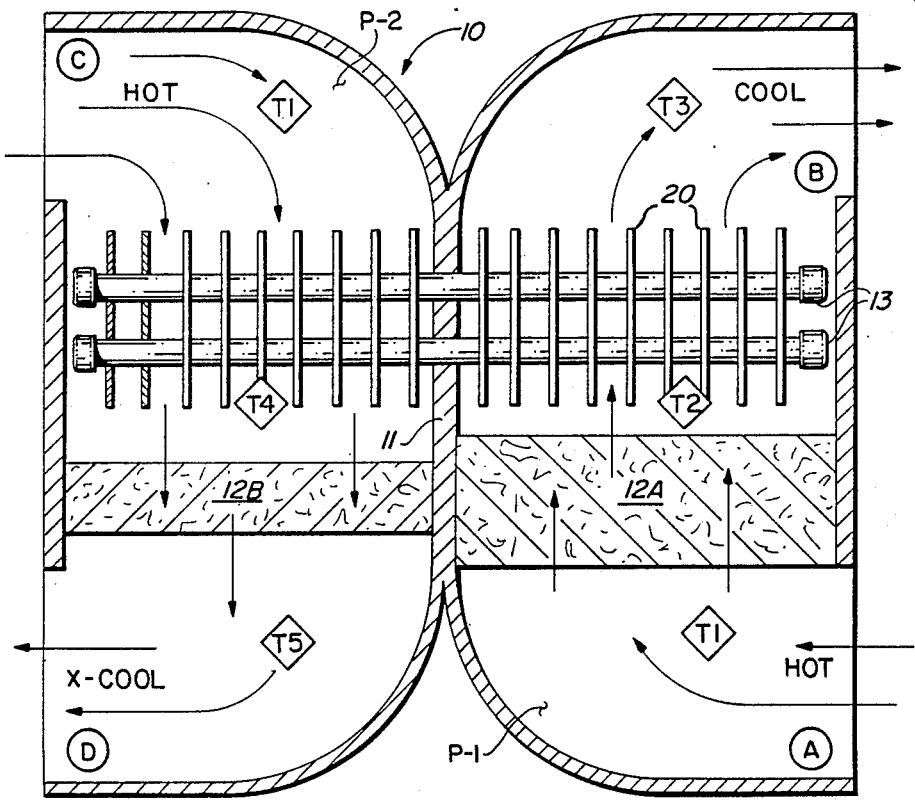
FIG-2

HEAT PIPE ASSISTED EVAPORATIVE COOLER

BACKGROUND

1. Field of the Invention

The invention relates to air conditioning systems. In particular, the invention relates to the complementary combination of heat pipe and evaporative cooling technologies to produce an evaporative cooler which efficiently functions under environmental conditions normally considered the operating preserve of compressor operated, refrigerant cooling systems.

2. Prior Art

Those who live in hot, dry regions are familiar with the evaporative cooler. These coolers typically function by forcing fan driven air to pass through an evaporative cooling pad which has been saturated with water. The hot air passing through the pad transfers heat to the water producing a change of state in the water from a liquid to a water vapor. The evaporative cooling technology is well known and, in the disclosure which follows, a familiarity with that technology is assumed. Thus, air blowers, water circulating pumps, piping, spray nozzles, catch reservoirs, and the like have not been delineated or illustrated. Such items known to the prior art are utilized with the present invention in manner already well established.

Heat pipes are also well known to the prior art. These are simple and inexpensive devices which can transport thermal energy at efficiencies greater than 90 percent and, by relying on the evaporation, condensation, and surface tension characteristics of a refrigerant working fluid, are able to transfer up to 500 times as much heat per unit weight as can a solid thermal conductor of the same cross section. Heat pipes have no moving parts and operate silently and reliably over long lifetimes. Heat may be transferred to and from the pipe by radiation, convention, or conduction, and the pipes have been used with a variety of heat sources such as open flames, electric heaters, or nuclear heat sources.

No known prior art combines the efficiencies of the heat pipe in a manner to complement the functioning of an evaporative cooler as in the instant invention. It is the object of the present invention to combine these two technologies in a complementary manner so as to produce an evaporative cooling system with performance characteristics equivalent to those achieved by a compressor operated refrigeration system but without the initial, the operating, and the maintenance which accompany a refrigeration system.

SUMMARY OF THE INVENTION

A heat pipe assisted evaporative cooler is disclosed which comprises a heat pipe and an evaporative cooler pad coupled together for air flow heat transfer between the two. There are means for controlling the direction of the air flow through the cooler. Particularly, there are means for directing air flow through the cooler pad then impinging the air on and flowing it past a first end of the heat pipe. In its passage through the evaporative cooler pad the air is cooled. This cool air then absorbs heat in the course of its passage past the first end of the heat pipe.

Alternatively, the means for controlling the direction of air flow through the cooler includes means for directing the air so as to impinge it on and flow it past a second end of the heat pipe from whence the air then flows through the cooler pad. In its passage across the second end of the heat pipe the air transfers heat to the pipe and is cooled. The air is further cooled as it traverses the evaporative cooling pad.

In a presently preferred embodiment of the invention herein first and second means for directing the air flow along the paths just described are included in the same embodiment. Where two directed paths of air are provided, there is an embodiment of the invention which includes means for segregating each of these air paths one from the other. Efficiency of operation may be increased when the first air path flows through a thicker cross section of the evaporative cooling pad then does the first air pad.

In a further attempt to summarize the invention it may be said to be an heat pipe assisted evaporative cooler which comprises a first air plenum through which a first volume of air flows. There is also a second air plenum to which a second volume of air flows. These two plena are coupled together by means of a heat pipe and a cooler pad. The heat pipe had a first end thereof which resides within the first air plenum and a second end thereof which resides within the second air plenum. So too, there is a moisture laden evaporative cooling pad which has a first section residing in the first air plenum and a second section residing in the second air plenum.

The arrangement is such that when the first volume of air passes through the first section of the cooler pad it is cooled and then impinges on the first end of the heat pipe where it is warmed. Meanwhile the second volume of the air impinges on the second end of the heat pipe which causes the air to be cooled. This cool air then passes through the second section of the cooler pad where it is further cooled.

As earlier noted the efficiency of operation of the cooler may be improved by making the first section of the cooler pad to have a thicker cross section than the second section of that pad.

Finally, the invention may be summarized in terms of the methodology for producing a heat pipe assisted evaporative cooler. The steps of the method include arranging a heat pipe and an evaporative cooler pad in such juxtaposition that a stream of air impinging on one will impinge on the other. A first end of the heat pipe and a first section of the pad are designated to have a first volume of air directed thereon. Having so designated the pipe end and pad section, the method requires the directing of a first volume of air to pass through the first section of the pad, to be cooled in that passage, the air to impinge in passing on the first end of the heat pipe where it is warmed in its passage.

Next, a second end of the heat pipe and a second section of the pad is designated upon which a second volume of air shall be directed. Logically, the following step directs a second volume of air so as to impinge in passing on the second end of the heat pipe. The air is cooled as it passes the second end of the heat pipe and then passes through the second section of the cooler pad where it is further cooled.

The methodology includes a step of providing the first section of the cooler pad with a thicker cross section than that of the second section of the pad. The step of segregating the air flow path of the first volume of air from the air flow path of the second volume of air is also available in practice of the method.

Product by process claims have been appended hereto to claim the heat pipe assisted evaporative cooler produced in practicing the methodology of the invention.

DESCRIPTION OF THE DRAWINGS

FIG. 1 is a partial sectional and perspective view of the interior of the Heat Pipe Assisted Evaporative Cooler.

FIG. 2 is a cross sectional view of the Cooler of FIG. 1, reoriented.

FIGS. 4 and 5 provide perspective views of the interior of a heat pipe.

A DETAILED DESCRIPTION OF THE INVENTION

Figure 3:
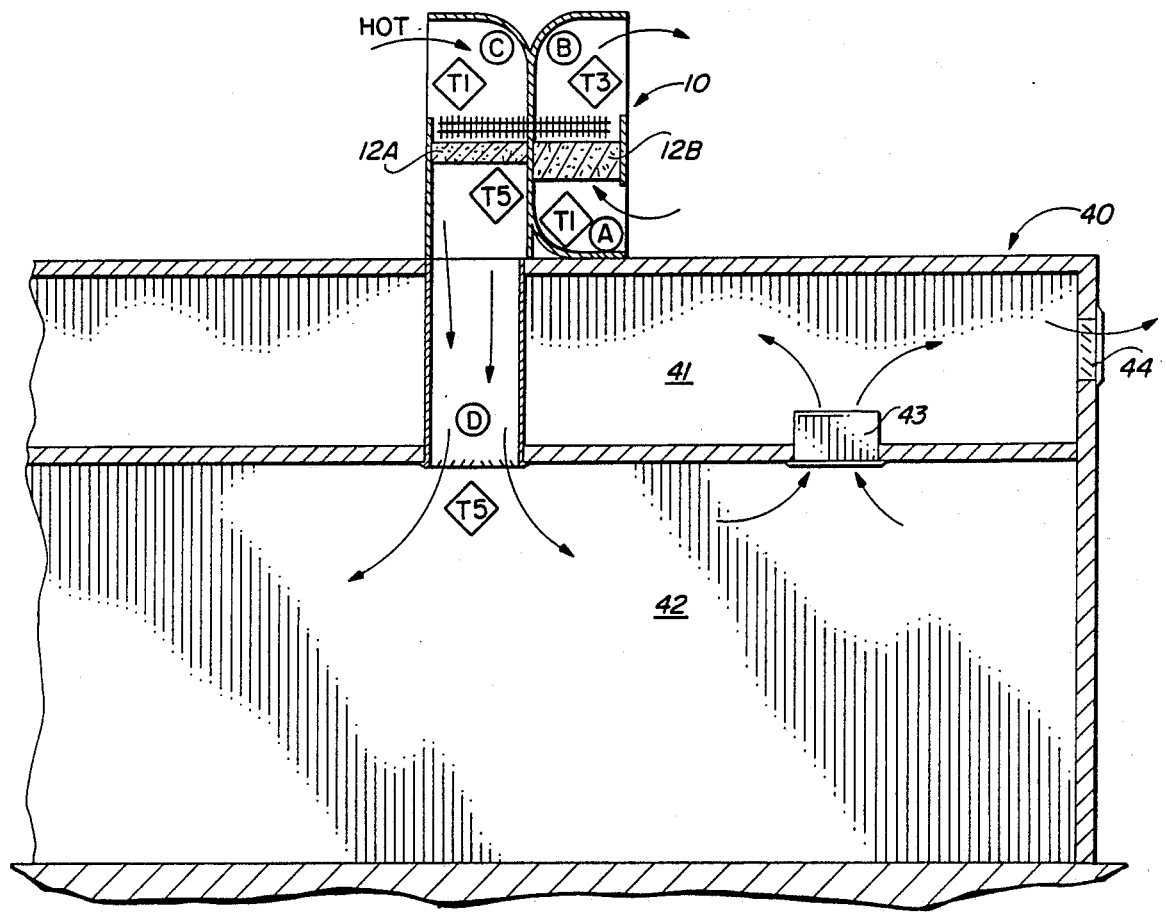
FIG. 3 is a cross sectional view of a building being cooled by the Heat Pipe Assisted Cooler.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

The illustration of FIG. 1 provides a perspective insight into the interior of a Heat Pipe Assisted Evaporative Cooler 10. An interior wall 11 defines the common boundary between air plenums P-1 and P2. Hot air enters plenum P-1 at entry A. So too, hot air enters plenum P-2 at point C.

FIG. 2 is a cross sectional view of the evaporative cooler of FIG. 1. FIGS. 1 and 2 are complementary illustrations useful in understanding the operation of the Heat Pipe Assisted Evaporative Cooler.

Figure 5:
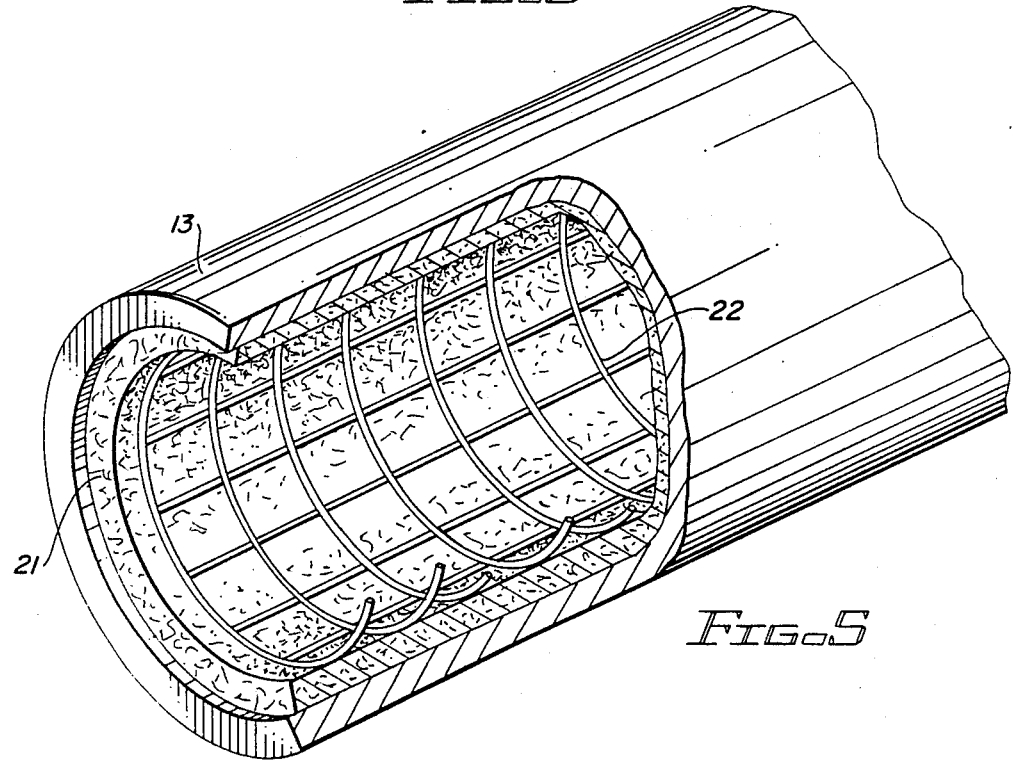

To further assist that understanding, it would be well to examine FIGS. 4 and 5 at this point.

FIG. 4 presents a perspective end view of an open section of heat pipe 13. The interior of heat pipe 13 is shown in enlarged detail in FIG. 5. The interior walls of heat pipe 13 are lined with a wicking material 21. In experimental models of the heat pipe, fabricated by the inventor, wicking 21 was made up of paper wipes commonly found in machine shops and automotive work places. However, any suitable wicking material may be utilized. Wicking 21 is maintained in position by the inherent spring loading provided by retainer screen 22. Retainer screen 22 was fabricated, for experimental purposes, from a metallic, open weave screen which when rolled to form a cylinder of a given diameter tended to unroll to a cylindrical form of a larger diameter when all restraints were removed from the screen. This tendency of screen 22 to unroll and increase its diameter provides the outward directed force to maintain the wicking in contact with the interior wall of heat pipe 13. No limitation is intended on the type of retainer used to maintain a layer of wicking in intimate contact with the interior wall of heat pipe 13. Any suitable retainer will suffice.

The construction of heat pipes is well known to those skilled in the art. Feldman and Whiting discuss the principles of heat pipe operation in an article printed in the February 1967 issue of *Mechanical Engineering*. Those principles will be considered briefly herein below.

Heat pipe 13 has its ends sealed and is charged with a gaseous refrigerant. A commonly used gaseous refrigerant is one available under the brand name FREON. If heat pipe 13 is cooled, the gaseous refrigerant will condense to a liquid state and saturate wicking 21. Conversely, the heating of heat pipe 13 will cause the liquid condensate to evaporate and return the refrigerant to a gaseous state. With each change of state, liquid or gaseous, there is an exchange of heat. The instant invention utilizes these heat transfer characteristics by subjecting different parts of heat pipe 13 to differing heat exchange conditions. Exactly how the invention functions, utilizing heat pipes in association with evaporative coolers will be made clear by further discussion of FIGS. 1 and 2.

As already noted interior wall 11 divides cooler 10 into two air flow plenums P-1 and P-2. Hot air enters plenum P-1 at inlet A at temperature T1, for example, 103° and 65° wet bulb (WB) temperature. An evaporative cooling pad 12 has a section in each plenum. The hot air passes through water saturated evaporated cooler pad 12A exiting at a reduced temperature T2, for example 69°. This cool air impinges upon those sections of heat pipe 13 which extend into air plenum P-1. As this cool air imposes itself on these sections of heat pipe 13 the air absorbs heat. The effect of this heat absorption is to cause the gaseous refrigerant within heat pipe 13 to condense and be absorbed by the wicking material 21 within heat pipes 13. Wicking material 21 is present along the entire length of heat pipe 13 and draws the liquid refrigerant to the left of heat pipe 13 as illustrated in FIG. 2 so that the wicking along the entire length of heat pipe 13 contains refrigerant in the liquid state. Heat transfer between air and heat pipe is facilitated by fins 20 coupled to heat pipes 13 and extending onto the air flow path. The illustration is not intended to limit the shape or size of heat transfer fins 20.

The result of the heat absorption by the air passing over heat pipes 13 within plenum P-1 is to raise the air temperature to temperature T3, for example, 72°. This air, cooled to temperature T3, may be utilized for secondary cooling purposes. It does not constitute the primary cooling air of the Heat Pipe Assisted Evaporative Cooler 10. This air at temperature T3 exits plenum P-1 at outlet B.

Air at the same temperature T1 which enters inlet A of plenum P-1 also enters inlet C of plenum P-2. The assumed temperature T1 has been taken as 103° F., 65° wet bulb, for illustrative purposes. This hot air at temperature T1 impinges upon those sections of heat pipe 13 which extend into air plenum P-2, to the left of the illustration of FIG. 2. Heat from the air impinging upon heat pipes 13 in plenum P-2 causes the refrigerant within those sections of heat pipe 13 to change from a liquid to a gaseous state. This change of state from liquid to gaseous removes liquid refrigerant from wicking 21 and causes the gas to reside within the central section of heat pipe 13. Removal of liquid refrigerant from the wicking within the heat pipe within plenum P-2 permits a further flow of liquid refrigerant from those sections of heat pipe 13 which reside within plenum P-1. Refrigerant in the gaseous state moves to those sections of heat pipe 13 in plenum P-1 to maintain the cycle.

As the refrigerant changes from a liquid to a gaseous state within the sections of heat pipe within plenum P-2, there is an absorption of heat from the air flowing over and about the heat pipes. Thus, hot air which entered inlet C at temperature T1 exits from its passage of heat pipes 13 at a reduced temperature T4, for example, 70° and 57° wet bulb. This air, at reduced temperature T4, traverses water saturated evaporative cooler pad 12B from which it exits at a further reduced temperature T5, for example, 57° and 55° wet bulb. This air at temperature T5 exits plenum P-2 at outlet D and is utilized as the primary cooling air output by cooler 10.

The manner in which the innovative cooler 10 may be utilized in practice is shown in FIG. 3. A building 40 has attic space 41 and living space 42. Living space 42 is intended to be cooled by cooler 10. With the cooler 10 mounted on the roof of building 40, as shown in FIG. 3, hot air enters inlet A to be evaporatively cooled so as to condense the refrigerant within the heat pipes and exit outlet B as cool air. This cool air exiting outlet B may be utilized for secondary cooling purposes where practical to do so. In some instances it may conceivably be mixed with the air exiting outlet D. See below.

Hot air also enters inlet C of cooler 10 and is cooled in its passage past the heat pipes as it causes the refrigerant to change state from liquid to gaseous. The air is further cooled by evaporative cooling and is output at outlet D into the area 42 of building 40 to achieve the desired cooling of area 42.

As with all evaporative cooling systems, it is desired that there be a continuous flow of cooling air through the area whose temperature is to be controlled. This means there must be a passage for air to escape from the cooled area. A ventilator duct 43 permits the air to flow into the attack space 41 and then exit building 40 by means of vent 44. In its passage through attic 41, the air tends to reduce the temperature within the attic.

Other arrangements for utilizing cooler 10 may be readily conceived, for example, the exhaust air from area 42 may be vented directly to the outside of building 40 while the somewhat cooled air exiting outlet B of cooler 10 might be directed into attic 41 to achieve cooling of that region.

In the various illustrations showing the cooling pads 12, one section 12B appears thicker than the section 12A. In experiments performed to evaluate the function of cooler 10, initially both pads 12A and 12B were the same thickness, six inches. Further experimentation led to an increase in the size of pad 12B to twelve inches. Increasing pad 12B to a twelve-inch thick pad significantly increased the performance of the invention. Increasing the thickness of pad 12A had very little affect on the overall performance. No limitation is intended by citing the actual thicknesses of pads utilized here. The affect on operation of utilizing pads of various thicknesses is presented in the table here below.

TABLE

| °F. | 6" Pad in P-1 6" Pad in P-2 | 12" Pad in P-1 6" Pad in P-2 |
| --- | --- | --- |
| T1 | 103°/65° WB | 103°/65° WB |
| T2 | 76.4° | 69° |
| T3 | 78° | 72° |
| T4 | 75.4°/55° WB | 70°/57° WB |
| T5 | 61°/55° WB | 57°/55° WB |

A refrigeration air conditioning unit rated at 1 Ton removes 12,000 BTU of heat per hour. The instant invention, using a pair of 1⅜ inch diameter heat pipes, 32 inches long, removes approximately 11,763 BTU/hr.—almost the equivalent of a 1 Ton rated air conditioner. Eight pipes, four pairs, remove 47,051 BTU/hr. or approximately Four Tons. Performance will vary with selected pipe diameters and lengths.

What has been disclosed is a cooler which uses evaporative cooling pads and heat pipes in complementary arrangement. The combined operation of these two elements permits the cooler to operate efficiently under temperature and humidity conditions at which conventional evaporative coolers prove impractical to use. The heat pipes serve the purpose normally fulfilled by evaporators and compressors in a refrigeration system. However, since there is no need for a compressor in this invention, the costs of purchasing and operating and maintaining a compressor operated refrigeration system are obviated. The invention provides the user with the performance of a refrigerant coolant system at the operating costs of an evaporative cooler system.

Those skilled in the art will conceive of other embodiments of the invention which may be drawn from the disclosure herein. For example, it is relatively easy to conceive of embodiments in which the heat pipes are curved to assume U-shapes, or the like, to allow variations in the manner in which air flow is directed. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. A heat pipe assisted evaporative cooler comprising:
    a heat pipe; and
    an evaporative cooler pad coupled to said heat pipe for air flow heat transfer between said heat pipe and said heater pad; and,
    means for controlling the direction of air flow through said cooler including:
        first means for directing a first volume of air through said cooler pad, to be evaporatively cooled, then further directing said air to impinge on and flow past a first end of said pipe such that said cooled air absorbs heat from said heat pipe; and
        second means for directing a second volume of air to impinge on and flow past a second end of said heat pipe to transfer heat to said heat pipe and to continue to flow through said cooler pad to be evaporatively cooled thereby.

2. The cooler of claim 1 further comprising means coupled to said heat pipe and said cooler pad for segregating the air flow of said first volume of air from the air flow of said second volume of air.

3. The cooler of claim 2 wherein the cross section of said cooler pad through which said first volume of air passes is thicker than the cross section of said cooler pad through which said second volume of air passes.

4. A heat pipe assisted evaporative cooler comprising:
    a first air plenum through which a first volume of air flows; a second air plenum through which a second volume of air flows; a heat pipe having a first end thereof residing in said first air plenum and a second end thereof residing in said second air plenum;
    a moisture laden evaporative cooler pad having a first section residing in said first air plenum and a second section residing in said second air plenum;
    whereby said first volume of air passes through said first section of said cooler pad to be cooled then impinges upon said first end of said heat pipe to be warmed, while said second volume of air impinges on said second end of said heat pipe to be cooled and then passes through said second section of said cooler pad to be further cooled.

5. The cooler of claim 4 wherein said first section of said cooler pad has a thicker cross section than said second section of said cooler pad.

6. The method for producing a heat pipe assisted evaporative cooler comprising the steps of:
  arranging a heat pipe and an evaporative cooler pad in such juxtaposition that a stream of air impinging on one will impinge on the other;
  designating a first end of said heat pipe and a first section of said pad upon which a first volume of air shall be directed;
  directing a first volume of air to pass through said first section of said pad to be cooled in said passage to impinge in passing on said first end of said first heat pipe to be warmed thereby;
  designating a second end of said heat pipe and a second section of said pad upon which a second volume of air shall be directed; and
  directing a second volume of air to impinge in passing on said second end of said heat pipe, to be cooled thereby, and to pass through said second section of said cooler pad to be further cooled in said passage.

7. The method of claim 6 further comprising the step of providing said first section of said cooler pad with a thicker cross section than that of said second section of said pad.

8. The method of claim 7 comprising the further step of segregating the air flow path of said first volume of air from the air flow path of said second volume of air.

9. The heat pipe assisted evaporative cooler produced by the methodology of claim 6.

10. The heat pipe assisted evaporative cooler produced by the methodology of claim 7.

11. The heat pipe assisted evaporative cooler produced by the methodology of claim 8.

* * * * *